J. S. WATERMAN.

Corpse Preserving Cases.

Reissued April 15, 1873.

No. 5,355.

WITNESSES.

George E. Carter

H. A. Holden

INVENTOR.

Joseph S. Waterman per Sylvanus Walker

Atty

AM. PHOTO LITHOGRAPHIC CO. N.Y. (OSBORNE'S PROCESS.)

UNITED STATES PATENT OFFICE.

JOSEPH S. WATERMAN, OF BOSTON, MASSACHUSETTS.

IMPROVEMENT IN CORPSE-PRESERVING CASES.

Specification forming part of Letters Patent No. 76,568, dated April 7, 1868; reissue No. 5,355, dated April 15, 1873; application filed March 17, 1873.

*To all whom it may concern:*

Figure 1:
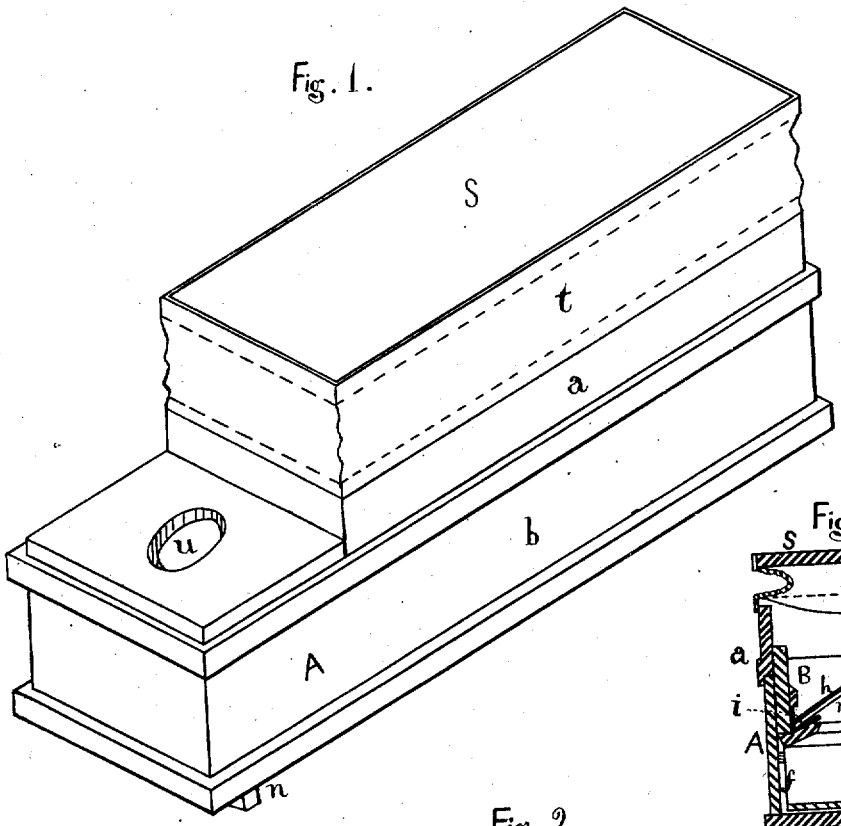
Figure 3:
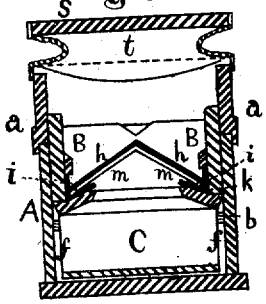
Figure 2:
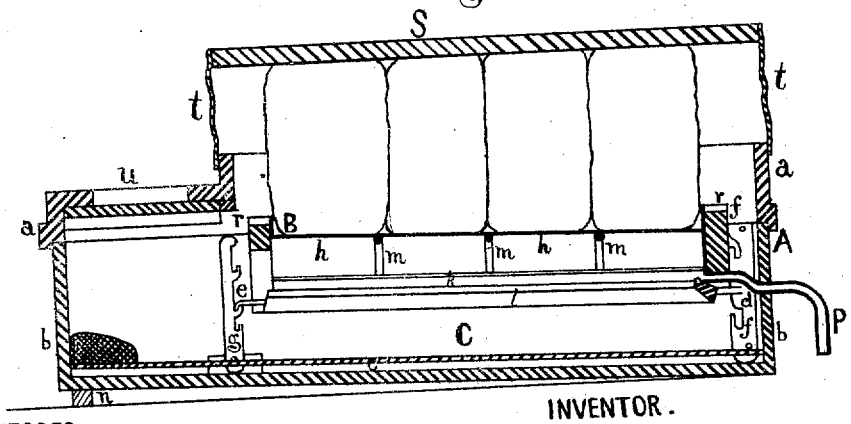

Be it known that I, JOSEPH S. WATERMAN, of Boston, in the county of Suffolk and State of Massachusetts, have invented certain new and useful Improvements in Corpse-Preserving Cases, of which the following is a specification:

Figure 1 is a perspective view of my improved corpse-preserving case. Fig. 2 is a longitudinal vertical section through the same, as indicated by dotted lines X Y, Fig. 1. Fig. 3 is a transverse vertical section through the same.

My present invention relates to certain improvements in corpse-preserving cases for which Letters Patent of the United States were granted to me on the 23d day of April, 1867; and consists in making the ice box or chamber adjustable within the case, so it can be raised or lowered for the purpose of increasing or diminishing the size of the corpse-chamber, and thus insuring the bottom of the ice-box being always in close proximity to the corpse, whether it be of large or small size, so as to cool it rapidly, as required; and my invention further consists in the peculiar form of the metallic ice-box, in combination with suitable gutters or conductors, the bottoms of which are covered with wood or other absorbent material, so as to prevent the moisture from collecting thereon and dripping upon the corpse, the conductors serving the double purpose of carrying off the water from the ice as it melts, and any moisture which may be condensed on the under side of the metallic bottom, thus insuring the corpse against being affected by moisture.

A is the corpse-preserving case, which is composed of two sections, *a b*, fitted snugly together, and so made that they can be taken apart when it is desired to open the case. B is the ice box or chamber, beneath which is the corpse-chamber C, at the bottom of which is a perforated rack, *c*, which serves to raise the corpse slightly, and permit the air to circulate freely around it. The ice-box B is provided at one end with two hooks, *d*, and at the opposite end with hooks *e*, the former fitting into notched bars *f*, secured permanently to the sides of the case, and the latter into similar bars *g*, which are pivoted at their lower ends so that they may be swung back when it is desired to remove the ice-box.

The bars *f g* being provided with a series of notches for the reception of the hooks *d e*, it will be seen that the ice-box may be readily secured at the desired height, so as to bring its angular metallic bottom *h* in very close proximity to the corpse, whether it be of large or small size, and thus cool it more rapidly than could be done were the metallic bottom *h* flat; its angular form allowing its sides to be brought very near to the bottom of the corpse-chamber C, and near the sides of the corpse, and thus cool it rapidly, as required.

Any other suitable device, instead of the hooks *d e* and notched bars *f g*, may be used for supporting the ice-box B, if preferred.

The bottom *h* of the ice-box is composed of zinc or other suitable metal, and is inclined down from the center on each side, as seen in Fig. 3, the water from the ice as it melts running down through openings *i* into the gutters or conductors *k* beneath, the conductors being so placed as to catch any moisture which may be condensed upon and run down the under side of the inclined bottom *h*. The corpse is thus prevented from becoming wet by the moisture dropping upon it from the bottom of the ice-box; and to still further guard against this, the conductors *k* are provided with a casing of wood, *l*, which prevents the moisture from collecting thereon. *m* are bent ribs, which serve to support the bottom *h*, and prevent it from being injured by the weight of the ice upon it. *n* is a wooden strip placed under the front end of the lower section *b*, so as to give the case a slight inclination, and thus cause the water to pass from the conductors *k* to a short transverse conductor, *o*, also provided with a casing of wood, from which it is drawn off through a pipe, *p*. This pipe *p* is represented as passing through the side of the case A, but it may pass through the bottom, if preferred. The ends of the ice-box are made of a less height than the sides, so as to leave spaces *r* for the passage of the cold air to the corpse-chamber below. The upper section *a* of the case A is provided with a lid or cover, *s*, which is connected with the sides of the section by means of rubber or other flexible material *t*, in order that the capacity of the ice box or chamber may be increased or diminished, to conform to the size of the ice within it.

This device, however, and also the spaces *r*, above described, form the subject of my aforesaid Letters Patent of April 23, 1867, and will not therefore be further described.

*u* is a pane of glass set in an aperture in the upper section of the case, through which the corpse may be viewed.

*Claims.*

What I claim as my invention is—

1. Making the ice-box B adjustable within the case A, so that it can be raised or lowered to increase or diminish the size of the corpse-chamber, for the purposes set forth.

2. The combination of the inclined metallic bottom *h* of the ice-box with conductors *k o*, when said conductors are covered with wood or its equivalent, substantially in the manner described, as and for the purposes set forth.

JOSEPH S. WATERMAN.

Witnesses:

SYLVENUS WALKER,
JOS. H. WHITMAN.